United States Patent
Wu et al.

(10) Patent No.: US 12,383,374 B2
(45) Date of Patent: Aug. 12, 2025

(54) HEAD ASSEMBLY FOR DENTAL CONTRA-ANGLE HAND-PIECE AND DENTAL CONTRA-ANGLE HAND-PIECE

(71) Applicant: GUILIN WOODPECKER MEDICAL INSTRUMENT CO., LTD., Guangxi (CN)

(72) Inventors: Xunxian Wu, Guangxi (CN); Kunyou Wu, Guangxi (CN); Rongqing Qin, Guangxi (CN); Shiyou Bin, Guangxi (CN); Benqin Zhang, Guangxi (CN); Jianhua Lin, Guangxi (CN); Sheng Sun, Guangxi (CN); Fengwen Wei, Guangxi (CN)

(73) Assignee: GUILIN WOODPECKER MEDICAL INSTRUMENT CO., LTD., Guangxi (CN)

(*) Notice: Subject to any disclaimer, the term of this patent is extended or adjusted under 35 U.S.C. 154(b) by 471 days.

(21) Appl. No.: 17/716,493

(22) Filed: Apr. 8, 2022

(65) Prior Publication Data
US 2022/0226072 A1    Jul. 21, 2022

Related U.S. Application Data

(63) Continuation-in-part of application No. PCT/CN2021/081589, filed on Mar. 18, 2021.

(30) Foreign Application Priority Data

Jan. 7, 2021    (CN) .......................... 202110017563.1
Apr. 1, 2022    (CN) .......................... 202210349369.8

(51) Int. Cl.
*A61C 1/12*    (2006.01)
*A61C 1/00*    (2006.01)
*A61C 1/05*    (2006.01)

(52) U.S. Cl.
CPC ............... *A61C 1/12* (2013.01); *A61C 1/0061* (2013.01); *A61C 1/052* (2013.01)

(58) Field of Classification Search
CPC ......... A61C 1/0061; A61C 1/052; A61C 1/08; A61C 1/087; A61C 1/10; A61C 1/12;
(Continued)

(56) References Cited

U.S. PATENT DOCUMENTS 4,184,257 A * 1/1980 Leonard ................. A61C 1/052
                                                                433/82
4,219,618 A * 8/1980 Leonard .................... A61C 1/00
                                                                433/80

FOREIGN PATENT DOCUMENTS

CN        2645627 Y    10/2004
CN        203677272 U   7/2014
(Continued)

OTHER PUBLICATIONS

International Search Report and Written Opinion with regard to PCTCN2021081589 issued on Sep. 13, 2021.
(Continued)

*Primary Examiner* — Thomas C Barrett
*Assistant Examiner* — Jennifer P Connell
(74) *Attorney, Agent, or Firm* — BCF LLP

(57) ABSTRACT

A head assembly for a dental contra-angle hand-piece and a dental contra-angle hand-piece are provided. The head assembly includes a hand-piece main body, a reversing valve movably connected to the hand-piece main body, and an inner water tube connected to the hand-piece main body, wherein the hand-piece main body is provided with a first flow channel and a second flow channel independent from each other, the first flow channel is configured to be in communication with a liquid outlet of a motor, and the second flow channel is configured to be in communication
(Continued)

with an external pipeline; the reversing valve is provided with a confluence channel, the reversing valve is configured to enable, when moving relative to the hand-piece main body, the first flow channel and the second flow channel to alternatively be in communication with the inner water pipe through the confluence channel.

12 Claims, 10 Drawing Sheets

(58) Field of Classification Search
CPC ........ F16K 11/02; F16K 11/06; F16K 11/065; F16K 11/07; F16K 11/0716; F16K 11/085; F16K 11/0856
See application file for complete search history.

(56) References Cited

FOREIGN PATENT DOCUMENTS

| | | |
|---|---|---|
| CN | 206026452 U | 3/2017 |
| CN | 209332321 U | 9/2019 |
| CN | 209611355 U | 11/2019 |
| CN | 209966592 U | 1/2020 |
| CN | 111067639 A | 4/2020 |
| CN | 210582680 U | 5/2020 |
| CN | 211836678 U | 11/2020 |
| CN | 214484649 U | 10/2021 |
| EP | 1279377 A1 | 1/2003 |
| EP | 1720581 A1 | 11/2006 |
| EP | 1720581 B1 | 11/2009 |
| JP | H0810267 A | 1/1996 |
| JP | 2000042008 A | 2/2000 |
| JP | 2001299774 A | 10/2001 |
| KR | 101069447 B1 | 9/2011 |

OTHER PUBLICATIONS

English Abstract for CN203677272 retrieved on Espacenet on Apr. 8, 2022.
English Abstract for CN209966592 retrieved on Espacenet on Apr. 8, 2022.
English Abstract for CN211836678 retrieved on Espacenet on Apr. 8, 2022.
English Abstract for CN209332321 retrieved on Espacenet on Apr. 8, 2022.
English Abstract for CN210582680 retrieved on Espacenet on Apr. 8, 2022.
Office Action with regard to to the counterpart CN Patent Application No. 202110017563.1 issued on May 31, 2024.
Notification to Grant with regard to the counterpart CN Patent Application No. 2021100175631 issued Sep. 25, 2024.

* cited by examiner

0001

HEAD ASSEMBLY FOR DENTAL CONTRA-ANGLE HAND-PIECE AND DENTAL CONTRA-ANGLE HAND-PIECE

CROSS REFERENCE TO RELATED APPLICATION

The present disclosure is a continuation-in-part application of the international patent application PCT/CN2021/081589 which claims priority to the Chinese patent application with the filing No. 202110017563.1 filed with the Chinese Patent Office on Jan. 7, 2021, and entitled "Head Assembly for Dental Contra-angle Hand-piece and Dental Contra-angle Hand-piece", the contents of each of which are incorporated herein by reference in entirety.

The present disclosure also claims priority to the Chinese patent application with the filing No. 202210349369.8 filed with the Chinese Patent Office on Apr. 1, 2022, and entitled "Head Module for Dental Contra-angle Hand-piece and Dental Contra-angle Hand-piece", the contents of which are incorporated herein by reference in entirety Technical Field The present disclosure relates to the field of medical equipment, in particular to a head assembly for a dental contra-angle hand-piece and a dental contra-angle hand-piece.

BACKGROUND

The existing dental contra-angle hand-pieces mainly include two types, i.e. inner-water-channel dental contra-angle hand-pieces and outer-water-channel dental contra-angle hand-pieces. The inner-water-channel dental contra-angle hand-pieces are frequently used, that is, a water path and a gas path are provided inside the dental contra-angle hand-piece, water and gas are transmitted by a motor to the water path and the gas path in the dental contra-angle hand-piece, and the water and the gas are sprayed out from a front end of a head to form atomized water. The water sprayed out by the dental contra-angle hand-piece needs to be delivered via the water path of the motor, and the water path of the motor cannot be disinfected or sterilized, so when the clinical treatment of diseases such as oral diseases requires sterile operation with physiological saline or other sterile solutions, the existing inner-water-channel dental contra-angle hand-pieces cannot realize the same, and a dedicated outer-water-channel dental contra-angle hand-piece is needed, resulting in inconvenient use. In addition, the existing outer-water-channel dental contra-angle hand-pieces are not provided with a built-in water path, and cooling water cannot be directly provided by a dental chair when a sterile environment is not needed, resulting in inconvenient use.

It has been found from researches that the existing dental contra-angle hand-pieces have the following defects: a single function and inconvenient use.

SUMMARY

Embodiments of the present application provide a head assembly for a dental contra-angle hand-piece, including:
a hand-piece main body, wherein the hand-piece main body is provided with a first flow channel and a second flow channel independent from each other, the first flow channel is configured to be in communication with a liquid outlet of a motor, and the second flow channel is configured to be in communication with an external pipeline;
an inner water pipe, wherein the inner water pipe is connected to the hand-piece main body; and
a reversing valve, wherein the reversing valve is provided with a confluence channel; the reversing valve is movably connected to the hand-piece main body, the reversing valve is configured to enable the first flow channel and the second flow channel to alternatively be in communication with the inner water pipe through the confluence channel, when moving relative to the hand-piece main body.

Optionally, in one or more embodiments, the head assembly includes;
a hand-piece main body, wherein the hand-piece main body is provided with a first flow channel and a second flow channel independent from each other, the first flow channel is configured to be in communication with a liquid outlet of a motor, and the second flow channel is configured to be in communication with an external pipeline;
a reversing valve, wherein the reversing valve is provided with a confluence channel, and a first port and a second port both in communication with the confluence channel; the reversing valve is movably connected with the hand-piece main body so as to be switched between a first operation position and a second operation position; when the reversing valve is located in the first operation position, the first port is in communication with the first flow channel and the second port is discommunicated from the second flow channel; and when the reversing valve is located in the second operation position, the first port is discommunicated from the first flow channel and the second port is in communication with the second flow channel; and
an inner water pipe, wherein the inner water pipe is in communication with the confluence channel, and is configured to deliver a fluid to a head portion of the hand-piece main body.

Optionally, in one or more embodiments, the hand-piece main body is provided with a fitting hole, the first flow channel and the second flow channel are both in communication with the fitting hole; the reversing valve is provided in the fitting hole, and the reversing valve is configured to slidably cooperate with the hand-piece main body in an extending direction of the hand-piece main body, so as to enable the reversing valve to be switched between the first operation position and the second operation position.

Optionally, in one or more embodiments, the hand-piece main body has a front end configured to extend into an oral cavity and a rear end configured to be close to an operator, the fitting hole is provided on an end surface where the rear end is located, and the second flow channel is provided closer to the rear end than the first flow channel.

Optionally, in one or more embodiments, the dental contra-angle hand-piece further includes a toggle member, the toggle member is connected to the reversing valve, the toggle member protrudes from an outer circumferential wall of the hand-piece main body, and the toggle member slidably cooperates with the hand-piece main body in the extending direction of the hand-piece main body, so as to drive the reversing valve to be switched between the first operation position and the second operation position.

Optionally, in one or more embodiments, the hand-piece main body is provided with a first limiting portion and a second limiting portion arranged at an interval in the extending direction of the hand-piece main body, the toggle member is located between the first limiting portion and the second limiting portion, and the first limiting portion and the second limiting portion are configured to alternatively abut against the toggle member, so as to limit a sliding range of the toggle member.

Optionally, in one or more embodiments, when the reversing valve is located in the first operation position, the toggle member abuts against the first limiting portion; and when the reversing valve is located in the second operation position, the toggle member abuts against the second limiting portion.

Optionally, in one or more embodiments, when the reversing valve is switched between the first operation position and the second operation position, a flow rate is adjusted by adjusting an overlapped area of the first port and the first flow channel during the communication between the first port and the first flow channel; and the flow rate is adjusted by adjusting an overlapped area of the second port and the second flow channel during the communication between the second port and the second flow channel.

Optionally, in one or more embodiments, the hand-piece main body is further provided with an operation hole in communication with the fitting hole, the operation hole is located on an outer circumferential wall of the hand-piece main body, the operation hole is a strip-shaped hole and extends along the extending direction of the hand-piece main body, the first limiting portion and the second limiting portion are provided on a hole wall of the operation hole, and the toggle member passes through the operation hole and protrudes from the outer circumferential wall of the hand-piece main body.

Optionally, in one or more embodiments, the hand-piece main body is provided with a pressure relief hole in communication with the fitting hole.

Optionally, in one or more embodiments, the inner water pipe is inserted into the confluence channel, and the inner water pipe is configured to slidably cooperate with the reversing valve in the extending direction of the hand-piece main body.

Optionally, in one or more embodiments, an inner circumferential wall of the hand-piece main body is further provided with an annular gas passage, and the annular gas passage is configured to be in communication with a gas outlet of the motor.

Optionally, in one or more embodiments, the head assembly further includes at least one sealing member, and the at least one sealing member is provided between the reversing valve and the hand-piece main body, and is configured to seal a gap between the hand-piece main body and the reversing valve.

Optionally, in one or more embodiments, an outer circumferential wall of the reversing valve is provided with at least one annular positioning groove, and the at least one sealing member is provided in the at least one annular positioning groove.

Optionally, in one or more embodiments, the at least one sealing member is a sealing ring, and the sealing ring is an O-ring, a V-ring, or a rectangular ring.

Optionally, in one or more embodiments, the hand-piece main body is provided with a transfer cavity in communication with the inner water pipe and a first mounting hole in communication with the transfer cavity, the reversing valve is rotatably connected to the first mounting hole and then rotatably connected to the hand-piece main body, and a first sealing ring is provided between the reversing valve and a hole wall of the first mounting hole.

Optionally, in one or more embodiments, the hand-piece main body is provided with a locking ring, and the locking ring abuts against a side of the reversing valve away from the hand-piece main body, so as to prevent the reversing valve from disengaging from the hand-piece main body via an orifice of a second mounting hole.

Optionally, in one or more embodiments, the reversing valve has an outer circumferential surface provided around an axis of rotation of the reversing valve and an inner end surface intersecting the axis of rotation; the confluence channel includes a first hole segment and a second hole segment, one end of the first hole segment is located on the outer circumferential surface, and the other end of the first hole segment is in communication with one end of the second hole segment, the other end of the second hole segment is located on the inner end surface, the end of the second hole segment located on the inner end surface is eccentrically arranged with respect to the axis of rotation; and the reversing valve has a first operation position and a second operation position which are switchable with each other when the reversing valve rotates relative to the hand-piece main body, wherein when the reversing valve is located in the first operation position, the first flow channel, the second hole segment, the first hole segment, and the transfer cavity are in communication in sequence, and the reversing valve blocks the second flow channel; and when the reversing valve is located in the second operation position, the second flow channel, the first hole segment, the second hole segment, and the transfer cavity are in communication in sequence, and the reversing valve blocks the first flow channel.

Optionally, in one or more embodiments, a second sealing ring is provided between the reversing valve and the hand-piece main body, and the reversing valve is configured to be rotatable relative to the second sealing ring, wherein when the reversing valve is located in the first operation position, an end of the second hole segment away from the first hole segment is located in a region surrounded by the second sealing ring, and the second hole segment is in communication with the first flow channel through the second sealing ring; and when the reversing valve is located in the second operation position, the reversing valve blocks the first flow channel through the second sealing ring.

Optionally, in one or more embodiments, the first flow channel includes an annular groove segment and a radial hole segment in communication with each other, the annular groove segment is provided around the axis of the hand-piece main body, the radial hole segment extends along a direction having an angle with the axis of the hand-piece main body, and the radial hole segment is configured to be in communication with the second hole segment through the second sealing ring when the reversing valve is located in the first operation position.

Optionally, in one or more embodiments, a third sealing ring is provided between the reversing valve and the hand-piece main body, and the reversing valve is configured to be rotatable relative to the third sealing ring, wherein when the reversing valve is located in the first operation position, the reversing valve blocks the second flow channel through the third sealing ring; and when the reversing valve is located in the second operation position, an end of the first hole segment away from the second hole segment is located in a region surrounded by the third sealing ring, and the first hole segment is in communication with the second flow channel through the third sealing ring.

Optionally, in one or more embodiments, a torque transmission portion is provided on the reversing valve, and the torque transmission portion is configured to be engaged with a force applying tool, so as to make the reversing valve rotate relative to the hand-piece main body under the driving of the force applying tool.

Optionally, in one or more embodiments, the torque transmission portion is provided as a protrusion or a groove.

Optionally, in one or more embodiments, at least one first limiting part is provided on the hand-piece main body, at least one second limiting part is provided on the reversing valve, and the at least one first limiting part and the at least one second limiting part are configured to abut against each other during rotation of the reversing valve relative to the hand-piece main body, so as to restrict a rotation range of the reversing valve.

Embodiments of the present disclosure further provide a dental contra-angle hand-piece, including the head assembly according to any one of the preceding embodiments.

Optionally, in one or more embodiments, the dental contra-angle hand-piece further includes a motor and an external pipeline, the motor is inserted into and matched with the hand-piece main body, and a liquid outlet of the motor is in communication with the first flow channel; and the external pipeline is inserted into the hand-piece main body and is in communication with the second flow channel.

Optionally, in one or more embodiments, an end surface where the rear end of the hand-piece main body close to an operator is located is provided with an insertion hole, and the motor is inserted into the insertion hole of the hand-piece main body.

Optionally, in one or more embodiments, the dental contra-angle hand-piece further includes a motor and an external pipeline, wherein both the motor and the external pipeline are connected to the hand-piece main body; the reversing valve of the head assembly is configured to make the liquid outlet of the motor and the external pipeline alternatively be in communication with the inner water pipe.

BRIEF DESCRIPTION OF THE DRAWINGS

In order to more clearly illustrate technical solutions of embodiments of the present disclosure, accompanying drawings which need to be used in the embodiments will be introduced briefly below, and it should be understood that the accompanying drawings below merely show embodiments of the present disclosure, therefore, they should not be considered as limitation on the scope, and those ordinarily skilled in the art still could obtain other relevant accompanying drawings according to these accompanying drawings, without using any creative efforts.

REFERENCE SIGNS

Figure 1:
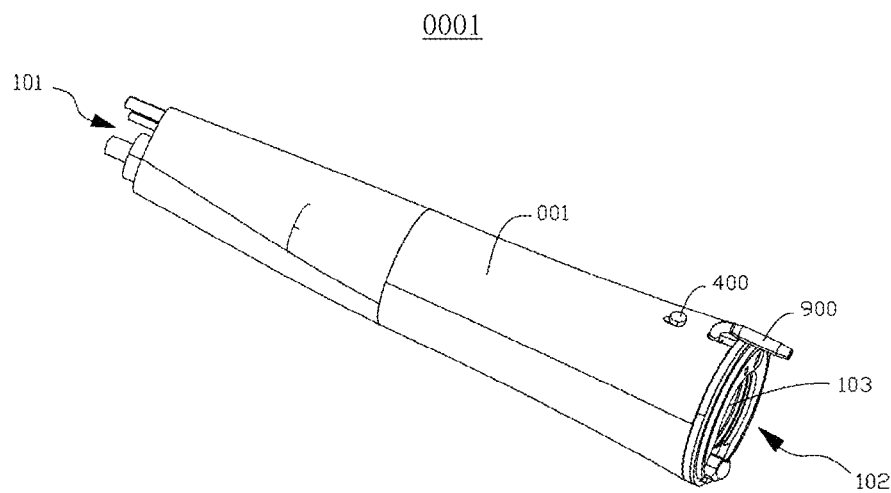
FIG. 1 is a structural schematic view of a head assembly for a dental contra-angle hand-piece in an embodiment of the present disclosure.
Figure 2:
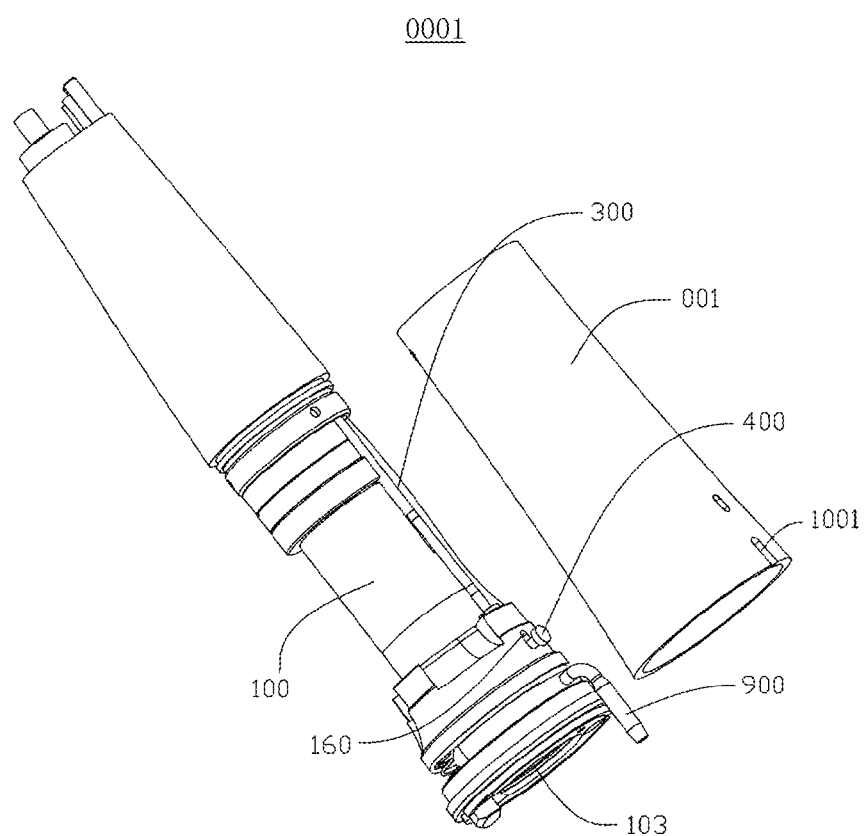
FIG. 2 is an exploded structural schematic view of the head assembly for a dental contra-angle hand-piece in an embodiment of the present disclosure.
Figure 3:
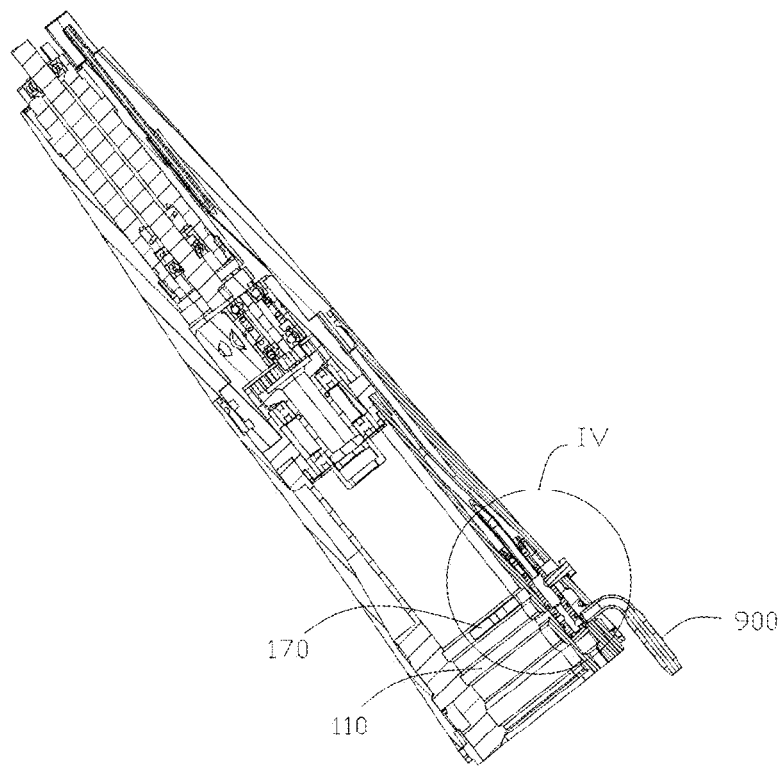
FIG. 3 is a sectional structural schematic view of the head assembly for a dental contra-angle hand-piece in an embodiment of the present disclosure.
Figure 4:
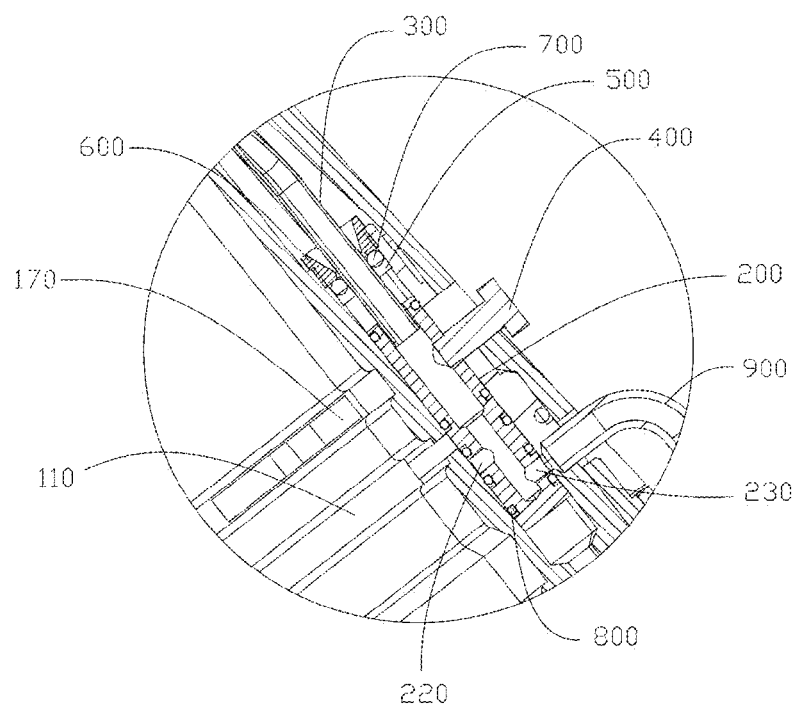
FIG. 4 is a local enlarged structural schematic view of portion IV in FIG. 3.

0001—head assembly; 100—hand-piece main body; 101—front end; 102—rear end; 103—insertion hole; 110—first flow channel; 120—second flow channel; 130—fitting hole; 131—insertion end; 140—pressure relief hole; 150—abutment surface; 160—operation hole; 161—first limiting portion; 162—second limiting portion; 170—annular gas passage; 200—reversing valve; 201—first end; 202—second end; 210—confluence channel; 220—first port; 230—second port; 240—annular positioning groove; 300—inner water pipe; 400—toggle member; 500—abutment ring; 600—fastener; 700—first sealing member; 800—second sealing member; 900—external pipeline; 001—housing; 1001—notch; 002—motor; 2001—liquid outlet; 2020—gas outlet; 1100—shell; 111—second mounting hole; 112—avoidance groove; 1200—fixing seat; 1221—annular groove segment; 1222—radial hole segment; 124—transfer cavity; 125—first mounting hole; 126—first limiting groove; 127—second limiting groove; 128—gas delivery channel; 1300—press ring; 310—sealing body; 311—outer circumferential surface; 312—inner end surface; 313—confluence channel; 3131—first hole segment; 3132—second hole segment; 320—force transmission body; 321—torque transmission portion; 322—second limiting part; 330—annular limiting groove; 410—first sealing ring; 510—second sealing ring; 610—third sealing ring; 700—sealing structure; 800—locking ring.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, and apparently, the embodiments described are some but not all embodiments of the present disclosure. Generally, components in the embodiments of the present disclosure, as described and shown in the accompanying drawings herein, may be arranged and designed in various different configurations.

Therefore, the detailed description below of the embodiments of the present disclosure provided in the accompanying drawings is not intended to limit the claimed scope of the present disclosure, but merely illustrates chosen embodiments of the present disclosure. All of other embodiments obtained by those ordinarily skilled in the art based on the embodiments in the present disclosure without using any creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "center", "upper", "lower", "left", "right", "vertical", "horizontal", "inner", and "outer" are based on orientation or positional relationships as shown in the accompanying drawings, or orientation or positional relationships of a product of the present disclosure conventionally placed when in use, merely for facilitating describing the present disclosure and simplifying the description, rather than indicating or implying that related devices or elements have to be in the specific orientation, or configured or operated in a specific orientation, therefore, they should not be construed as limiting the present disclosure. Besides, terms such as "first", "second", and "third" are merely for distinctive description, but should not be construed as indicating or implying importance in the relativity.

Moreover, the terms "horizontal", "vertical" and the like do not mean that the parts are required to be absolutely horizontal or overhanging, but may be slightly inclined. For example, for "horizontal", it merely means that a structure is more horizontal in comparison with "vertical", rather than being completely horizontal, while the structure can be slightly inclined.

In the description of the present disclosure, it should be further illustrated that, unless otherwise specifically specified and defined, the terms "set", "install", "link", and "connect" should be understood in a broad sense, for example, a connection may be a fixed connection, a detachable connection, or an integrated connection; it may be a mechanical connection or an electrical connection; it may be direct joining or indirect joining through an intermediate medium, and it also may be inner communication between two elements. For those ordinarily skilled in the art, specific meanings of the above-mentioned terms in the present disclosure could be understood according to specific circumstances.

At present, the dental contra-angle hand-pieces mainly include two types of inner-water-channel contra-angle hand-pieces and outer-water-channel contra-angle hand-pieces. Water of the inner-water-channel contra-angle hand-piece is delivered by a motor to an inner water pipe; and water of the outer-water-channel contra-angle hand-pieces is delivered to an inner water pipe through an external pipeline. As the motor part of the inner water pipe is not easy to disinfect or clean, the inner-water-channel contra-angle hand-pieces are not suitable for delivering a sterile solution, at this time, the outer-water-channel contra-angle hand-piece needs to be used for processing, so the operation is complex, the labor intensity is high, and the efficiency is low. Meanwhile, when the outer-water-channel contra-angle hand-piece is used to deliver a liquid, the external pipeline of the outer-water-channel contra-angle hand-piece is close to a head of the hand-piece. In this way, a volume of a front end of the head assembly is increased, making the front end of the head assembly occupy a large space, while the oral cavity has a limited operation space, thus the operation is inconvenient. In other words, the existing dental contra-angle hand-pieces have a single function and are inconvenient to use.

It should be understood that the front end of the head assembly is the end located at the oral cavity, and atomized water formed by mixing the liquid and the gas can be sprayed out from the front end of the head.

Referring to FIG. 1 to FIG. 16, in view of this, the present embodiment provides a head assembly (also called head module) 0001 for a dental contra-angle hand-piece, wherein the head assembly has both functions of inner-water-channel water delivery and outer-water-channel water delivery. In this way, when in use, the inner-water-channel water delivery and the outer-water-channel water delivery can be flexibly selected, enabling diversified functions, convenient switching, flexible and convenient operation, low labor intensity, high operation efficiency, wide application range and a low cost.

Referring to FIG. 1 to FIG. 4, in the present embodiment, the head assembly 0001 for a dental contra-angle hand-piece includes:

a hand-piece main body (also called head main body) 100, wherein the hand-piece main body 100 is provided with a first flow channel (also called first channel) 110 and a second flow channel (also called second channel) 120 independent from each other, the first flow channel 110 is configured to be in communication with a liquid outlet 2001 of a motor 002, and the second flow channel 120 is configured to be in communication with an external pipeline (e.g., external water pipe) 900;

a reversing valve (also called adjusting valve) 200, wherein the reversing valve 200 is provided with a confluence channel (also called reversing channel) 210, and a first port 220 and a second port 230 which are both in communication with the confluence channel 210; the reversing valve 200 is movably connected with the hand-piece main body 100 so as to be switched between a first operation position and a second operation position; when the reversing valve is located in the first operation position, the first port 220 is in communication with the first flow channel 110 and the second port 230 is discommunicated from the second flow channel 120; and when the reversing valve is located in the second operation position, the first port 220 is discommunicated from the first flow channel 110 and the second port 230 is in communication with the second flow channel 120; and an inner water pipe 300, wherein the inner water pipe 300 is in communication with the confluence channel 210, and is configured to deliver a fluid to a head portion of the hand-piece main body 100.

For the dental contra-angle hand-piece head assembly provided by the present embodiment, a state of the head assembly can be adjusted as required according to a field situation when the clinical treatment is carried out, to correspondingly adjust it to achieve inner-water-channel or outer-water-channel water delivery, then the operation is convenient and reliable. Specifically, when the inner-water-channel water delivery is required, that is, when the water is delivered from the motor 002 to the inner water pipe 300, the reversing valve 200 is adjusted so that the reversing valve 200 moves to the first operation position, and at this time, the first port 220 is in communication with the first flow channel 110, the liquid outlet 2001 of the motor 002 is in communication with the first port 220 through the first flow channel 110, and the first port 220 is in communication with the inner water pipe 300 through the confluence channel 210, so that the water delivered by the motor 002 flows through the first flow channel 110, the first port 220, and the confluence channel 210 in sequence to the inner water pipe 300, and flows out from the inner water pipe 300, to be mixed with the gas to form a water mist. When the outer-water-channel water delivery is needed, that is, when the water is not delivered from the motor 002 to the inner water pipe 300, but is delivered from the external pipeline 900 to the inner water pipe 300, the reversing valve 200 is adjusted so that the reversing valve 200 moves to the second operation position, and the second port 230 is in communication with the second flow channel 120, at this time, the external pipeline 900, the second flow channel 120, the second port 230, the confluence channel 210, and the inner water pipe 300 are in communication in sequence, so that the water delivered through the external pipeline 900 can smoothly flow into the inner water pipe 300, and flow out from the inner water pipe 300, to be mixed with the gas to form a water mist. Thus, the head assembly provided by the present embodiment can be switched between the state of inner-water-channel water delivery and the state of outer-water-channel water delivery, thus satisfying the use requirements of different scenarios, having diversified functions, being flexible and convenient to use, improving the operation efficiency and achieving safe and reliable operation.

Meanwhile, when the reversing valve 200 is switched between the first operation position and the second operation position, during the communication between the first port 220 and the first flow channel 110, the overlapped portion of the first port 220 and the first flow channel 110 gradually increases, the flow rate can be adjusted by adjusting an overlapped area of the first port 220 and the first flow channel 110, realizing the function of adjusting flow rate. Similarly, during the communication between the second port 230 and the second flow channel 120, the flow rate can also be adjusted by adjusting the overlapped area of the second port 230 and the second flow channel 120.

Figure 5:
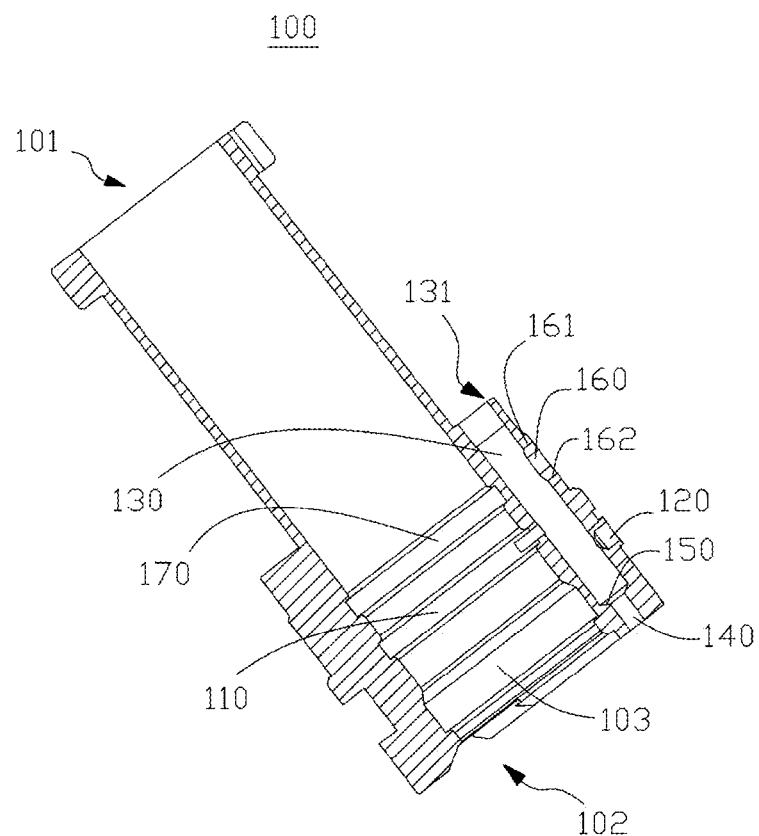
FIG. 5 is a partial sectional structural schematic view of a hand-piece main body in an embodiment of the present disclosure.

Referring to FIG. 5, in the present embodiment, optionally, the hand-piece main body 100 has a front end 101 which is close to a patient in an operation state and a rear end 102 used for being held by an operator, wherein the front end 101 may also be called as a head end, and the rear end 102 may also be called as a tail end. An end surface where the rear end 102 of the hand-piece main body 100 is located is provided with an insertion hole 103 for allowing the motor 002 to be inserted thereinto, an inner circumferential wall of the hand-piece main body 100 is provided with the first flow channel 110 in an annular shape, the first flow channel 110 is provided around an axis of the insertion hole 103, an outer circumferential wall of the hand-piece main body 100 is provided with the second flow channel 120, and the first flow channel 110 is located on a side of the second flow channel 120 close to the front end 101 of the hand-piece main body 100. That is, the second flow channel 120 is provided close to the rear end 102 of the hand-piece main body 100, in other words, the distance between the second flow channel 120 and the rear end 102 is smaller than the distance between the second flow channel 120 and the front end 101, in this way, the external pipeline 900 in communication with the second flow channel 120 will not increase the volume of the head end, and when the head end extends into a patient's oral cavity, the external pipeline 900 will not enter the oral cavity. The head end has a small volume, and is easy to operate.

Optionally, the hand-piece main body 100 is further provided with a fitting hole 130 and a pressure relief hole 140 in communication with the fitting hole 130, both the fitting hole 130 and the pressure relief hole 140 extend along a length direction of the hand-piece main body 100, an end of the fitting hole 130 close to the front end 101 of the hand-piece main body 100 is an insertion end 131, the pressure relief hole 140 is in communication with an end of the fitting hole 130 close to the rear end 102 of the hand-piece main body 100, that is, the pressure relief hole 140 is located at a side of the fitting hole 130 close to the rear end 102 of the hand-piece main body 100, and meanwhile, an end of the pressure relief hole 140 away from the fitting hole 130 extends to an end surface of the rear end 102 of the hand-piece main body 100.

Optionally, the fitting hole 130 and the pressure relief hole 140 are both cylindrical holes, the fitting hole 130 is coaxial with the pressure relief hole 140, and the diameter of the fitting hole 130 is greater than the diameter of the pressure relief hole 140, so as to form an abutment surface 150 in an annular shape at a position where the fitting hole 130 is in communication with the pressure relief hole 140.

It should be noted that the first flow channel 110 is in communication with the fitting hole 130 through a connecting hole, and the second flow channel 120 is in communication with the fitting hole 130.

Optionally, the hand-piece main body 100 is further provided with an operation hole 160 in communication with the fitting hole 130, the operation hole 160 is located on the outer circumferential wall of the hand-piece main body 100, a hole wall of the operation hole 160 is provided with a first limiting portion 161 and a second limiting portion 162 arranged at an interval in an axial direction of the hand-piece main body 100, and the first limiting portion 161 and the second limiting portion 162 are configured to limit a sliding range of the reversing valve 200 in an extending direction of the hand-piece main body 100.

Optionally, the operation hole 160 may be a strip-shaped hole, and the operation hole 160 extends along the axial direction of the hand-piece main body 100. With such configuration, the operation hole 160 has a small volume, occupies a small occupation space, and is easy to process, and the strength of the hand-piece main body 100 is not easily weakened.

Figure 6:
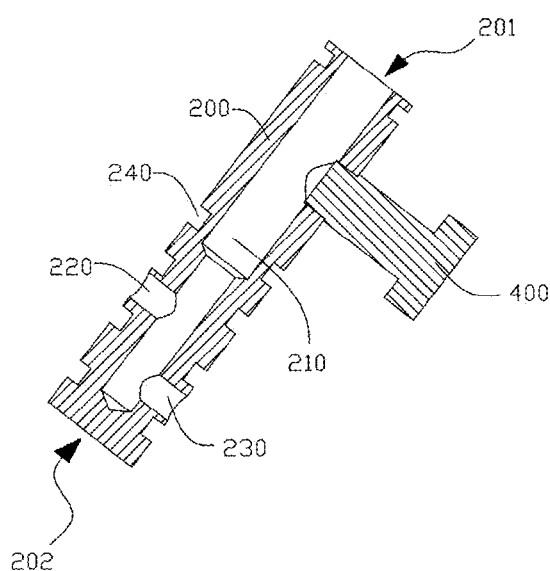
FIG. 6 is a sectional structural schematic view of a reversing valve and a toggle member in an embodiment of the present disclosure.

Referring to FIG. 6, in the present embodiment, optionally, the reversing valve 200 is of a cylindrical structure, the reversing valve 200 is provided with the confluence channel 210 at a first end 201 in its axial direction, and the confluence channel 210 is spaced apart from a second end 202 of the reversing valve 200 in its axial direction. The first port 220 and the second port 230 are both provided on the circumferential wall of the reversing valve 200, and are spaced apart from each other in a circumferential direction of the reversing valve 200, for example, the first port 220 and the second port 230 are uniformly arranged at an interval in the circumferential direction of the reversing valve 200, that is, angles of the first port 220 and the second port 230 in the circumferential direction of the reversing valve 200 are 180°. The first port 220 is located on a side of the second port 230 close to the first end 201, that is, the second port is closer to the second end 202 than the first port 220.

It should be noted that the reversing valve 200 may not be of a cylindrical structure, for example, may also be of a structure having an elliptical cross section or a square cross section, which may be set as needed. By providing the reversing valve 200 as a cylindrical structure, it is convenient to seal a gap between the reversing valve 200 and the hole wall of the fitting hole 130.

When the reversing valve 200 is fitted with the hand-piece main body 100, the second end 202 of the reversing valve 200 is inserted from the insertion end 131 of the fitting hole 130, the first end 201 of the reversing valve 200 is corresponding to the insertion end 131, and the inner water pipe 300 is inserted into the first end 201 of the reversing valve 200 from the insertion end 131. With such design, the reversing valve 200 slidably cooperates with the fitting hole 130 in the axial direction of the fitting hole 130, and when the reversing valve 200 slides to a first operation position, the first port 220 is in communication with the first flow channel 110 through the connecting hole, and the outer circumferential wall of the reversing valve 200 blocks the second flow channel 120, at this time, the inner-water-channel water delivery can be carried out. When the reversing valve 200 slides to a second operation position, the outer circumferential wall of the reversing valve 200 blocks the connecting hole, and the second port 230 is in communication with the second flow channel 120, and at this time, the outer-water-channel water delivery can be carried out. Meanwhile, when the second port 230 is close to the rear end 102 of the hand-piece main body 100, and the second port 230 is connected to the external pipeline 900 through the second flow channel 120, the external pipeline 900 is located at the rear end 102 of the hand-piece main body 100, the external pipeline 900 is not located at the front end 101 of the hand-piece main body 100, the front end 101 of the hand-piece main body 100 has a small volume, requires a small space when operating, and is convenient and flexible to operate in the oral cavity with limited space.

Figure 7:
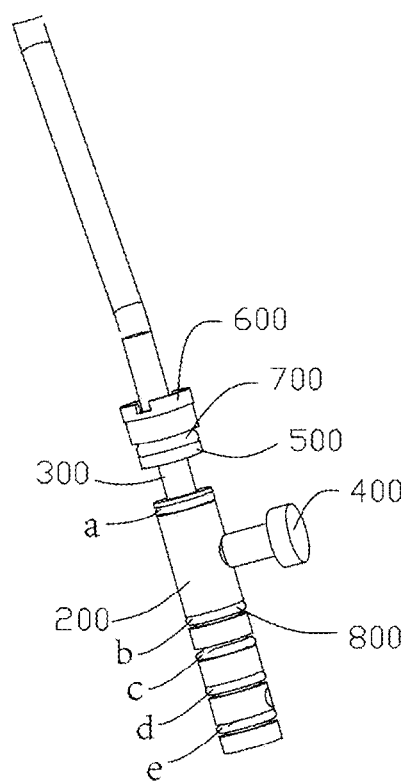
FIG. 7 is a partial structural schematic view of the head assembly for a dental contra-angle hand-piece in an embodiment of the present disclosure.

Referring to FIG. 6 and FIG. 7, in the present embodiment, optionally, the head assembly for a dental contra-angle hand-piece further includes a toggle member 400, an end of the toggle member 400 is in communication with the reversing valve 200, and the toggle member 400 passes through the operation hole 160 and protrudes out from the outer circumferential wall of the hand-piece main body 100. The toggle member 400 is located between the first limiting portion 161 and the second limiting portion 162, and an outer wall of the toggle member 400 is in contact with the hole wall of the operation hole 160 in the circumferential direction of the hand-piece main body 100, thereby preventing the reversing valve 200 from rotating in the fitting hole 130, so that relative positions of the first port 220, the second port 230, the first flow channel 110, and the second flow channel 120 are accurate and reliable. When the position of the reversing valve 200 needs to be switched, the toggle member 400 is operated so that the toggle member slides between the first limiting portion 161 and the second limiting portion 162. Specifically, when the toggle member 400 moves to abut against the first limiting portion 161, the reversing valve 200 is located in the first operation position, at this time, the first port 220 is in communication with the first flow channel 110, and the second port 230 is not in communication with the second flow channel 120; when the toggle member 400 moves to abut against the second limiting portion 162, the reversing valve 200 is located in the second operation position, at this time, the second port 230 is in communication with the second flow channel 120, and the first port 220 is not in communication with the first flow channel 110. Such configuration facilitates adjusting the position of the reversing valve 200 through the toggle member 400, and meanwhile facilitates judging the operation state of the reversing valve 200 according to the position of the toggle member 400, then the operation is convenient and reliable.

In addition, as there is the abutment surface 150 at a joint of the fitting hole 130 and the pressure relief hole 140, when the reversing valve 200 slides from the first operation position to the second operation position, the abutment surface 150 has a function of restricting the sliding of the reversing valve 200, thus preventing the reversing valve 200 from sliding out from the pressure relief hole 140. When the reversing valve 200 slides, the gas can be discharged from the pressure relief hole 140. The reversing valve 200 flexibly slides, and is not easily stuck in the fitting hole 130. Obviously, when the reversing valve 200 is located in the second operation position, the second end 202 of the reversing valve 200 does not necessarily abut against the abutment surface 150, and it is also feasible to achieve limiting by only relying on the second limiting portion 162 abutting against the toggle member 400.

It should be understood that in other embodiments, a driving mechanism can be provided to drive the toggle member 400 to move, so that the toggle member adjusts the position of the reversing valve 200, then the reversing valve 200 can be switched between the first operation position and the second operation position. For example, the driving mechanism may be a motor screw transmission mechanism, a cylinder mechanism, a hydraulic cylinder mechanism, an electric push rod, or the like.

In addition, the operation positions of the reversing valve 200 also can be switched not by sliding linearly with respect to the hand-piece main body 100, for example, in other embodiments, the operation positions of the reversing valve 200 can be switched by rotating with respect to the hand-piece main body 100, or the operation positions of the reversing valve 200 is switched by sliding and simultaneously rotating with respect to the hand-piece main body 100.

Referring to FIG. 7, in the present embodiment, optionally, the inner water pipe 300 is inserted into the confluence channel 210 from the first end 201 of the reversing valve 200 after passing through the insertion end 131, and the inner water pipe 300 slidably cooperates with the confluence channel 210, that is, when the reversing valve 200 slides relative to the fitting hole 130, it meanwhile slides relative to the inner water pipe 300, at the same time, the reversing valve 200 will not disengage from the inner water pipe 300 during the sliding, and the connection stability between the two is high.

Optionally, the fitting hole 130 is provided therein with an abutment ring 500, and the fitting hole 130 is provided with an inner thread on a hole wall thereof located at a side of the abutment ring 500 close to the insertion end 131. The inner water pipe 300 is sheathed with a fastener 600 and a first sealing member 700, the inner water pipe 300 penetrates through the abutment ring 500 and is inserted into the confluence channel 210, the fastener 600 is screwed into the fitting hole 130, and the first sealing member 700 is clamped between the fastener 600 and the abutment ring 500, enabling good sealing performance and allowing it to be not easy to leak.

In the present embodiment, optionally, the head assembly for a dental contra-angle hand-piece further includes a plurality of second sealing members 800, the plurality of second sealing members 800 are provided in the fitting hole 130, located between the hole wall of the fitting hole 130 and the reversing valve 200, and are configured to seal the hole wall of the fitting hole 130 and the outer circumferential wall of the reversing valve 200.

It should be noted that the second sealing members 800 can be embedded in the fitting hole 130, and after the reversing valve 200 is inserted into the fitting hole 130 from the insertion end 131 of the fitting hole 130, the hole wall of the fitting hole 130 and the reversing valve 200 are sealed by the second sealing members 800. Alternatively, the second sealing members 800 are sleeved over the reversing valve 200 and form with the reversing valve 200 a combined structure, and when the reversing valve 200 is inserted into the fitting hole 130, the second sealing members 800 realize the sealing of the reversing valve 200 and the hole wall of the fitting hole 130. In the present embodiment, illustration is made by taking the second sealing members 800 being sleeved over the reversing valve 200 as an example.

The number of second sealing members 800 is five, and all of the five second sealing members 800 are sleeved over the reversing valve 200. Optionally, the outer circumferential wall of the reversing valve 200 is provided with five annular positioning grooves 240, and the five second sealing members 800 are respectively provided in the five annular positioning grooves 240. The second sealing members 800 have accurate and reliable positions, and are not easily displaced, rendering good sealing effect.

For convenience of description, it is assumed that in a direction from the first end 201 to the second end 202 of the reversing valve 200, the five second sealing members 800 are sealing member a, sealing member b, sealing member c, sealing member d, and sealing member e, respectively, and when the five second sealing members 800 are fitted to the reversing valve 200, the first port 220 on the reversing valve 200 is located between the sealing member c and the sealing member d, and the second port 230 on the reversing valve 200 is located between the sealing member d and the sealing member e. When the reversing valve 200 is located in the first operation position, the first flow channel 110 is in communication with the first port 220, and both the first flow channel 110 and the first port 220 are located between the sealing member d and the sealing member e; when the reversing valve 200 is located in the second operation position, the second flow channel 120 is in communication with the second port 230, the second flow channel 120 and the second port 230 are both located between the sealing member d and the sealing member e, and the first flow channel 110 is located between the sealing member b and the sealing member c.

It should be noted that both the first sealing member 700 and the second sealing member 800 may be sealing rings, and the sealing rings may be O-rings, V-rings, rectangular rings or the like. Shapes of the first sealing member 700 and the second sealing member 800 may be different.

In other embodiments, the head assembly for a dental contra-angle hand-piece further includes an external pipeline 900, and the external pipeline 900 is inserted into the second port 230.

It should be noted that, the inner circumferential wall of the hand-piece main body 100 is further provided with an annular gas passage 170 configured to be in communication with the gas outlet 2020 of the motor 002, the annular gas passage 170 is in communication with a gas delivery pipe, the gas delivery pipe is configured to deliver the gas to the front end 101 of the hand-piece main body 100, so that the gas and the water are mixed to form a water mist at the front end 101 of the hand-piece main body 100.

In other embodiments, the hand-piece main body 100 is sheathed with a housing 001, the toggle member 400 extends out of the housing 001, and correspondingly, the housing 001 is provided with a through hole corresponding to the operation hole 160. Meanwhile, the housing 001 is provided with a notch 1001 capable of exposing the second port 230 outside the housing 001.

When the head assembly for a dental contra-angle hand-piece provided in the present embodiment is used, the position of the reversing valve 200 can be adjusted as needed, and when the reversing valve 200 is located in the first operation position, the first port 220 is in communication with the first flow channel 110, and inner-water-channel water delivery can be realized. When the reversing valve 200 is located in the second operation position, the second port 230 is in communication with the second flow channel 120, and outer-water-channel water delivery can be realized. The head assembly has diversified functions, is flexible to operate, and has high operation efficiency. Meanwhile, when the reversing valve 200 is in the first operation position, the reversing valve 200 can be properly adjusted, so that the overlapped area of the first port 220 and the first flow channel 110 is changed, thus adjusting the flow rate. Similarly, when the reversing valve 200 is in the second operation position, the overlapped area of the second port 230 and the second flow channel 120 can also be adjusted, thereby adjusting the flow rate.

Figure 8:
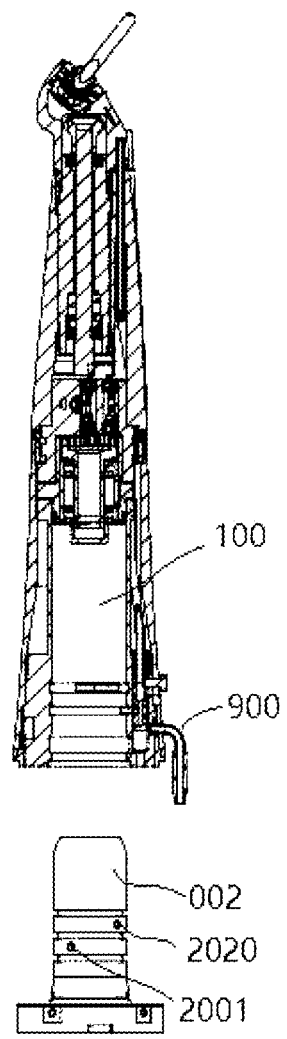
FIG. 8 is an exploded structural schematic view of the dental contra-angle hand-piece in an embodiment of the present disclosure.

Referring to FIG. 8, the present embodiment further provides a dental contra-angle hand-piece, including a motor 002 and the head assembly for a dental contra-angle hand-piece mentioned in the above embodiments, the motor 002 is inserted into the insertion hole 103 of the hand-piece main body 100, and the liquid outlet 2001 of the motor 002 is in communication with the first flow channel 110, the gas outlet 2020 of the motor 002 is in communication with the annular gas passage 170, and the motor 002 is configured to supply water to the first flow channel 110 when the dental contra-angle hand-piece performs inner-water-channel water delivery, thus, the water flows from the first flow channel 110 and the first port 220 to the confluence channel 210, and finally flows out from the inner water pipe 300.

The dental contra-angle hand-piece provided by the present embodiment is capable of performing the inner-water-channel water delivery or the outer-water-channel water delivery as needed, has diversified functions, is flexible and reliable to operate, and has high safety.

Figure 9:
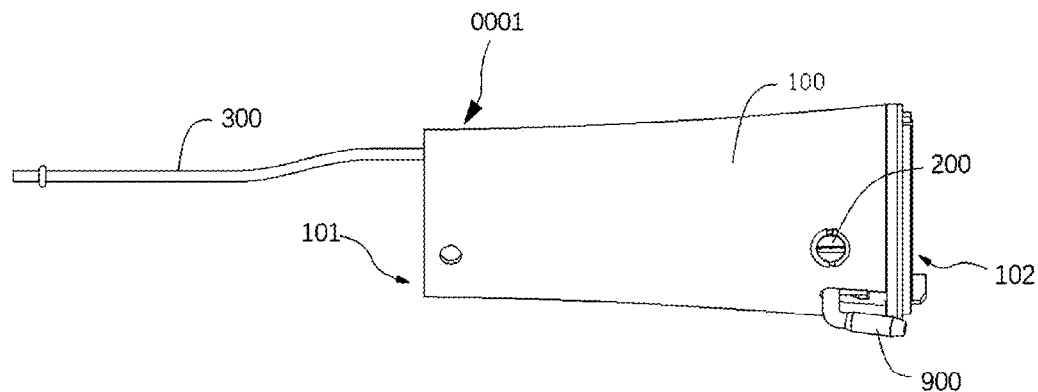
FIG. 9 is a structural schematic view of another head assembly for a dental contra-angle hand-piece in an embodiment of the present disclosure.
Figure 10:
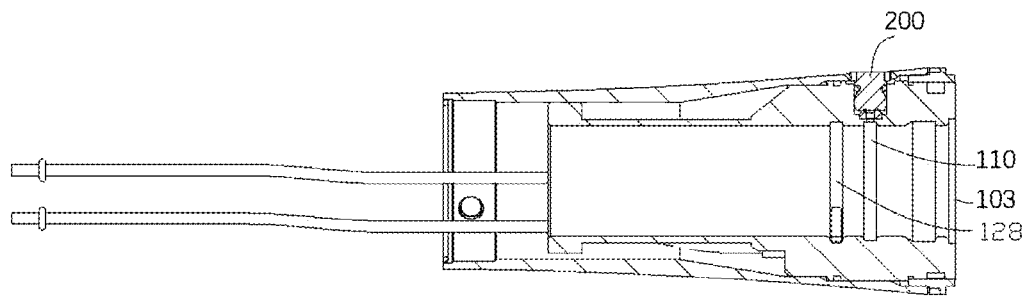
FIG. 10 is a segmental structural schematic view of the another head assembly for a dental contra-angle hand-piece in an embodiment of the present disclosure.
Figure 11:
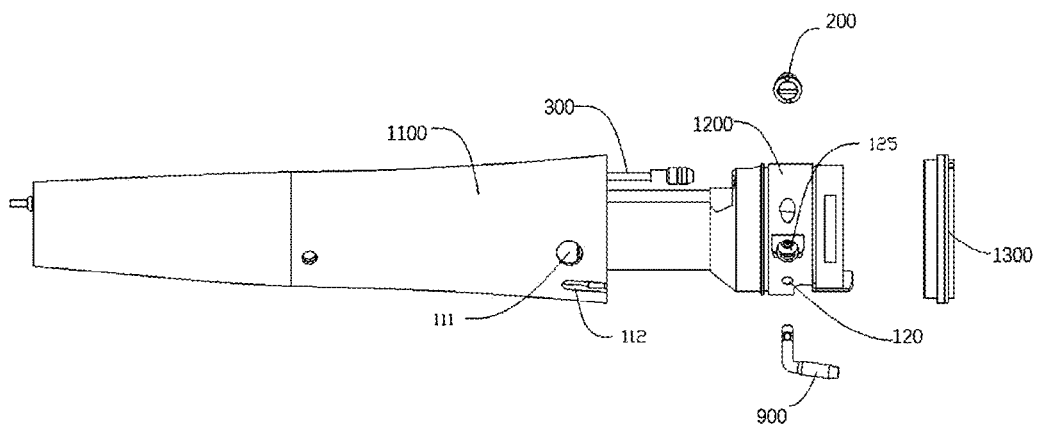
FIG. 11 is an exploded structural schematic view of the another head assembly for a dental contra-angle hand-piece in an embodiment of the present disclosure.

Referring to FIG. 9 to FIG. 11, in the present embodiment, a head assembly 0001 for a dental contra-angle hand-piece includes a hand-piece main body 100, an inner water pipe 300, and a reversing valve 200. The hand-piece main body 100 is provided with a first flow channel 110 and a second flow channel 120 independent from each other, wherein the first flow channel 110 is configured to be in communication with a liquid outlet (or liquid delivery channel) of the motor 002, and the second flow channel 120 is configured to be in communication with an external pipeline 900. The inner water pipe 300 is connected to the hand-piece main body 100. The reversing valve 200 is provided with a confluence channel 313, the reversing valve 200 is rotatably connected to the hand-piece main body 100, and the reversing valve 200 is configured to enable, when rotating relative to the hand-piece main body 100, the first flow channel 110 and the second flow channel 120 to alternatively be in communication with the inner water pipe 300 through the confluence channel 313.

It should be understood that the first flow channel 110 and the second flow channel 120 being alternatively in communication with the inner water pipe 300 through the confluence channel 313 means that when the reversing valve 200 is rotated, the confluence channel 313 of the reversing valve 200 can make the first flow channel 110 be in communication with the inner water pipe 300, so as to realize the function of inner-water-channel water delivery, and at this time, the second flow channel 120 is not in communication with the inner water pipe 300, and the liquid in the external pipeline 900 will not be delivered into the inner water pipe 300; similarly, when the reversing valve 200 is rotated, the confluence channel 313 of the reversing valve 200 can also make the second flow channel 120 in communication with the inner water pipe 300, so as to realize the function of outer-water-channel water delivery, at this time, the first flow channel 110 is not in communication with the inner water pipe 300, so that the liquid will not be delivered from the motor 002 into the inner water pipe 300.

The operation principle of the head assembly 0001 for a dental contra-angle hand-piece provided in the present embodiment is as follows.

When needing to perform inner-water-channel water delivery, that is, when water is delivered from the motor 002 to the inner water pipe 300, the reversing valve 200 is operated, to make the reversing valve 200 rotate relative to the hand-piece main body 100, and during the rotation, the reversing valve 200 can move to a position where the first flow channel 110, the confluence channel 313, and the inner water pipe 300 are in communication in sequence, so that the motor 002 delivers the liquid from the first flow channel 110 to the confluence channel 313, and then the liquid enters the inner water pipe 300 from the confluence channel 313, thus realizing that the liquid is delivered from the motor 002 to the inner water pipe 300, the liquid is mixed with the gas delivered by the motor 002 to form a water mist, and the water mist is sprayed out from a front end of the hand-piece main body 100.

When needing to perform outer-water-channel water delivery, that is, when the water is not delivered from the motor 002 to the inner water pipe 300, but is delivered from the external pipeline 900 to the inner water pipe 300, the reversing valve 200 continues to rotate, to make the reversing valve 200 rotate to a position where the second flow channel 120, the confluence channel 313, and the inner water pipe 300 are in communication in sequence, so that the liquid delivered through the external pipeline 900 can smoothly flow to the inner water pipe 300 and flow out from the inner water pipe 300, to be mixed with the gas to form a water mist. In this way, the operation state of the head assembly is adjusted as required according to the field situation when clinical treatment is carried out, so that it can be switched between two states of inner-water-channel water delivery and outer-water-channel water delivery, thus it is convenient and flexible to operate, and easy and convenient to use, and has a low cost.

Meanwhile, when the reversing valve is rotated with respect to the hand-piece main body, during the communication between the confluence channel and the first flow channel, an overlapped part of the confluence channel and the first flow channel is gradually increased, and the flow rate can be adjusted by adjusting an overlapped area of the confluence channel and the first flow channel, thereby achieving the function of adjusting flow rate. Similarly, during the communication between the confluence channel and the second flow channel, the flow rate can also be adjusted by adjusting the overlapped area of the confluence channel and the second flow channel.

With reference to FIG. 10, in the present embodiment, it needs to be noted that the hand-piece main body 100 is in an elongated shape, and two ends of the hand-piece main body 100 in a length extending direction thereof are respectively a front end 101 and a rear end 102, wherein the front end 101 may also be referred to as a head end, the rear end 102 may also be referred to as a tail end, the front end 101 is configured to extend into a patient's oral cavity, and the rear end 102 is configured to be held by an operator. Optionally, the hand-piece main body 100 includes a shell 1100, a fixing seat 1200, and a press ring 1300, wherein an end of the shell 1100 is configured to be open (i.e. the end is an opening), the fixing seat 1200 can be inserted into the shell 110 or pulled out from the shell 110 through the opening, the press ring 1300 is connected to the shell 1100, and limits the fixing seat 1200 in the shell 1100, and the fixing seat 120 will not freely slide out from the open end of the shell 1100. The inner water pipe 300 is provided in the shell 1100, and an end of the inner water pipe 300 is connected to the fixing seat 1200. An end surface of the fixing seat 1200 close to the rear end 102 is provided with an insertion hole 103 configured to allow the motor 002 to insert thereinto, an axis of the insertion hole 103 extends along the length direction of the hand-piece main body 100, and the hole wall of the insertion hole 103 is provided with the first flow channel 110 and a gas delivery channel 128 arranged at an interval in the length extending direction of the hand-piece main body 100, and the gas delivery channel 128 is closer to the front end of the hand-piece main body 100 than the first flow channel 101. The first flow channel 101 includes an annular groove segment 1221 and a radial hole segment 1222 arranged around the axis of the insertion hole 103, the radial hole segment 1222 is in communication with the annular groove segment 1221, and the radial hole segment 1222 extends along a direction perpendicular to the axis of the insertion hole 103. Obviously, in other embodiments, the radial hole segment 1222 further may form, with the axis of the insertion hole 103, an angle other than 90° and zero. When the motor 002 is inserted into the insertion hole 103, a part of the motor 002 is butt-jointed to the open end of the shell 1100, the liquid outlet of the motor 002 is in communication with the annular groove segment 1221, and a gas delivery hole on the motor 002 is in communication with the gas delivery channel 128.

It should be noted that the fixing seat 1200 can be fixedly connected to the shell 1100 by means of screws, snap structures or the like.

Figure 14:
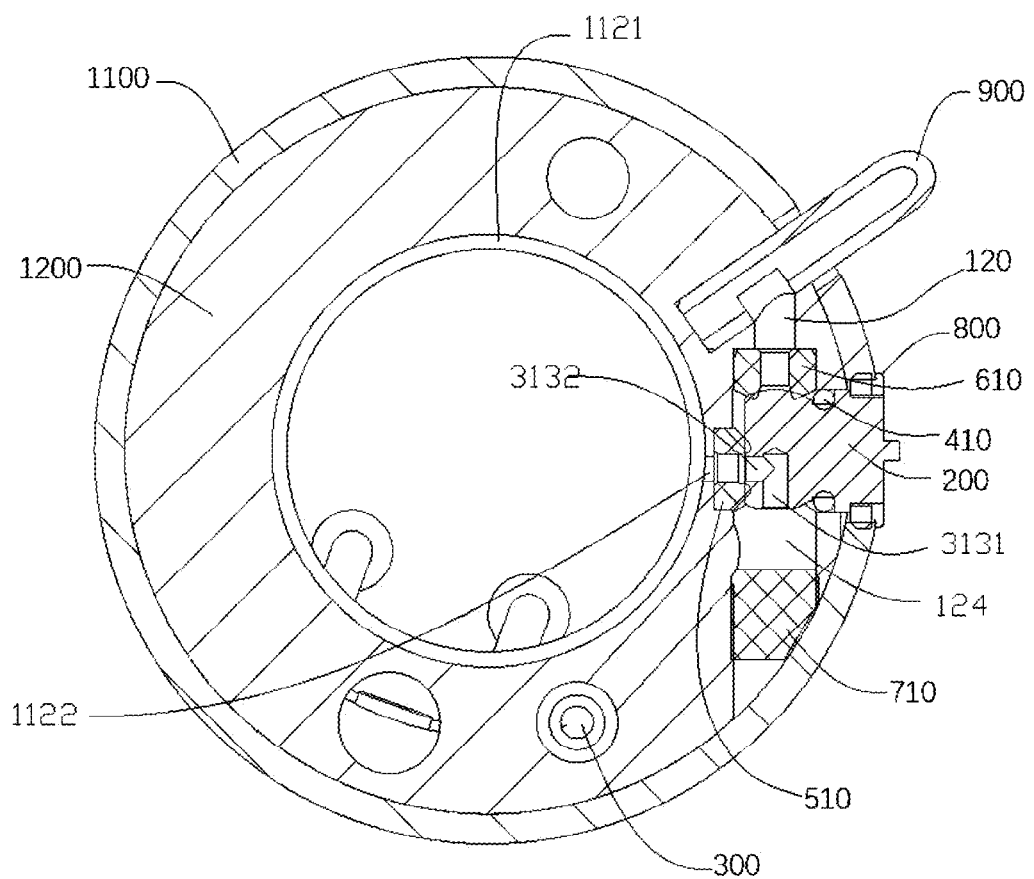
FIG. 14 is a structural schematic view of the head assembly when the reversing valve is located in a first operation position in an embodiment of the present disclosure.

With reference to FIG. 14, meanwhile, the second flow channel 120 is provided on the fixing seat 1200, and the second flow channel 120 is provided close to the rear end 102 of the hand-piece main body 100, in other words, a distance between the second flow channel 120 and the rear end 102 is smaller than a distance between the second flow channel 120 and the front end 101, in this way, the external pipeline 900 in communication with the second flow channel 120 is away from the front end, and will not increase the volume of the front end. When the front end is extended into the patient's oral cavity, the external pipeline 900 will not enter the oral cavity, in this way, the front end has a small volume, and is easy to operate. The fixing seat 1200 is further provided with a transfer cavity and a first mounting hole 125 in communication with the transfer cavity, and the transfer cavity is in communication with the inner water pipe 300. The shell 1100 is provided with an avoidance groove 112 configured to avoid the external pipeline 900, and the avoidance groove 112 is in communication with the second flow channel 120. The shell 1100 is further provided with a second mounting hole 111 in communication with the first mounting hole 125. The reversing valve 200 is rotatably connected to the first mounting hole 125 and the second mounting hole 111, and a first sealing ring 410 is provided between the reversing valve 200 and a hole wall of the first mounting hole 125, preventing the liquid in the transfer cavity from leaking from a gap between the first mounting hole 125 and the reversing valve 200. In the above, an axis of the first mounting hole 125 is perpendicular to the extending direction of the hand-piece main body 100. Obviously, in other embodiments, the axis of the first mounting hole 125 and the extending direction of the hand-piece main body 100 may also form an angle other than zero. A first limiting groove 126 and a second limiting groove 127 are further provided on a cavity wall of the transfer cavity, wherein the first limiting groove 126 and the second limiting groove 127 can both be provided as circular grooves, and an end of the radial hole segment 1222 away from the annular groove segment 1221 is located on a groove bottom wall of the first limiting groove 126; and an end of the second flow channel 120 is located on a groove bottom wall of the second limiting groove 127. The first limiting groove 126 and the second limiting groove 127 are respectively provided with a second sealing ring 510 and a third sealing ring 610, wherein the second sealing ring 510 is in communication with the radial hole segment 1222, and the third sealing ring 610 is in communication with the second flow channel 120; further, an annular end surface of the third sealing ring 610 away from the groove bottom wall of the second limiting groove 127 is a sealing surface, and the sealing surface is a partial spherical surface or a partial cylindrical surface.

Further, a sealing structure 700 is provided in the transfer cavity 124, which can prevent the liquid in the transfer cavity 124 from leaking from a connection gap between the shell 1100 and the fixing seat 1200.

Figure 12:
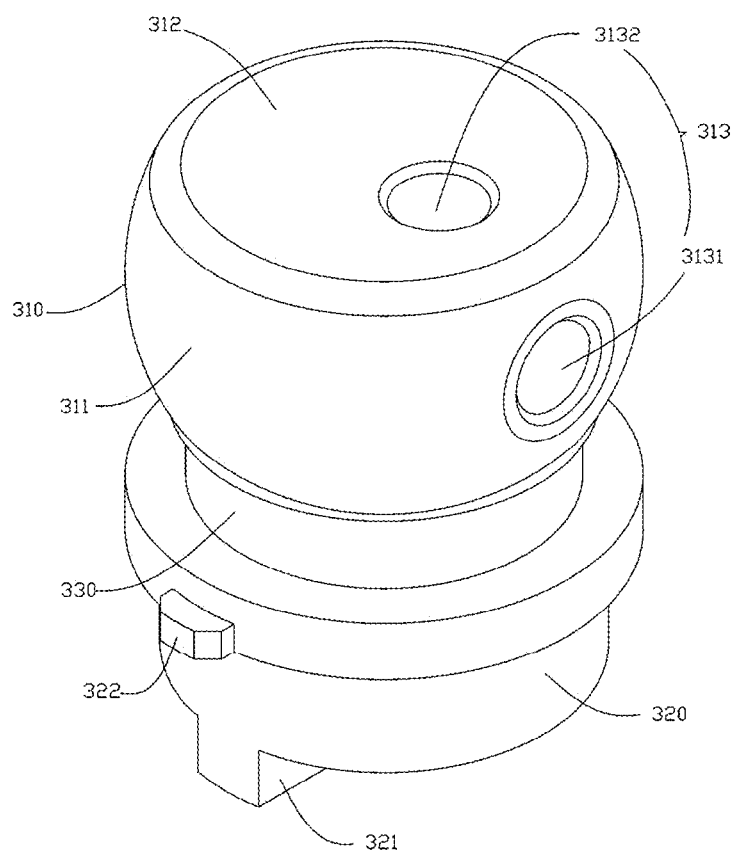
FIG. 12 is a structural schematic view of a reversing valve in an embodiment of the present disclosure.
Figure 13:
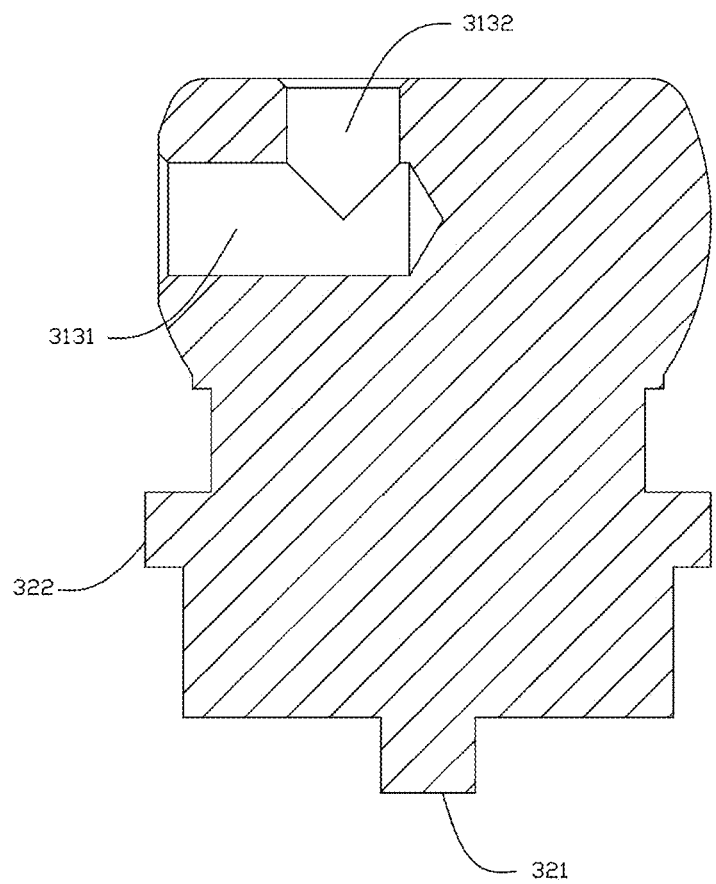
FIG. 13 is a segmental structural schematic view of the reversing valve in an embodiment of the present disclosure.

Referring to FIG. 12 to FIG. 13, in the present embodiment, optionally, the reversing valve 200 includes a sealing body 310 and a force transmission body 320 connected to each other, and the sealing body 310 and the force transmission body 320 may be configured as an integrated structure. The sealing body 310 has an outer circumferential surface 311 and an inner end surface 312 connected to the outer circumferential surface 311, the outer circumferential surface 311 is a partial spherical surface or a cylindrical surface, the inner end surface 312 is a circular surface, and the force transmission body 320 is located at an end of the sealing body 310 in an axial direction thereof, that is, the inner end surface 312 of the sealing body 310 is located at an end of the sealing body 310 away from the force transmission body 320. The axis of the sealing body 310 is an axis of rotation of the reversing valve 200. The confluence channel 313 includes a first hole segment 3131 and a second hole segment 3132, wherein one end of the first hole segment 3131 is located on the outer circumferential surface 311, and the other end of the first hole segment 3131 is in communication with one end of the second hole segment 3132, the other end of the second hole segment 3132 is located on the inner end surface 312, the end of the second hole segment 3132 located on the inner end surface 312 is eccentrically arranged with respect to the axis of rotation, and further, a center of the inner end surface 312 is located outside a region surrounded by an outer contour of one end of the second hole segment 3132 located at the inner end surface 312. An annular limiting groove 330 is formed at a position where the sealing body 310 is connected with the force transmission body 320, and the first sealing ring 410 is embedded in the annular limiting groove 330. During fitting, the reversing valve 200 passes through the second mounting hole 111 and is inserted into the first mounting hole 125, the inner end surface 312 abuts against the second sealing ring 510, and the outer circumferential face 311 abuts against the third sealing ring 610. Moreover, a part of the force transmission body 320 away from the sealing body 310 may protrude out from a port of the second mounting hole 111 away from the first mounting hole 125, facilitating in operating the force transmission body 320 to make the same drive the sealing body 310 to rotate.

It should be understood that, the outer circumferential surface 311 cooperates with the third sealing ring 610, here, when the reversing valve 200 is rotated relative to the hand-piece main body 100, the sealing body 310 will be rotated relative to the third sealing ring 610 and the second sealing ring 510, and the outer circumferential surface 311 will be rotated relative to the third sealing ring 610, a sealing surface of the third sealing ring 610 fits with the outer circumferential surface 311 of the sealing body 310, so that during the rotation, the sealing state is always maintained and dynamic sealing is realized. In this way, when the sealing surface of the third sealing ring 610 is a spherical surface, the outer circumferential surface 311 of the sealing body 310 is also correspondingly provided as a spherical surface. Similarly, when the sealing surface of the third sealing ring 610 is a cylindrical surface, the outer circumferential surface 311 of the sealing body 310 is also correspondingly provided as a cylindrical surface.

Figure 15:
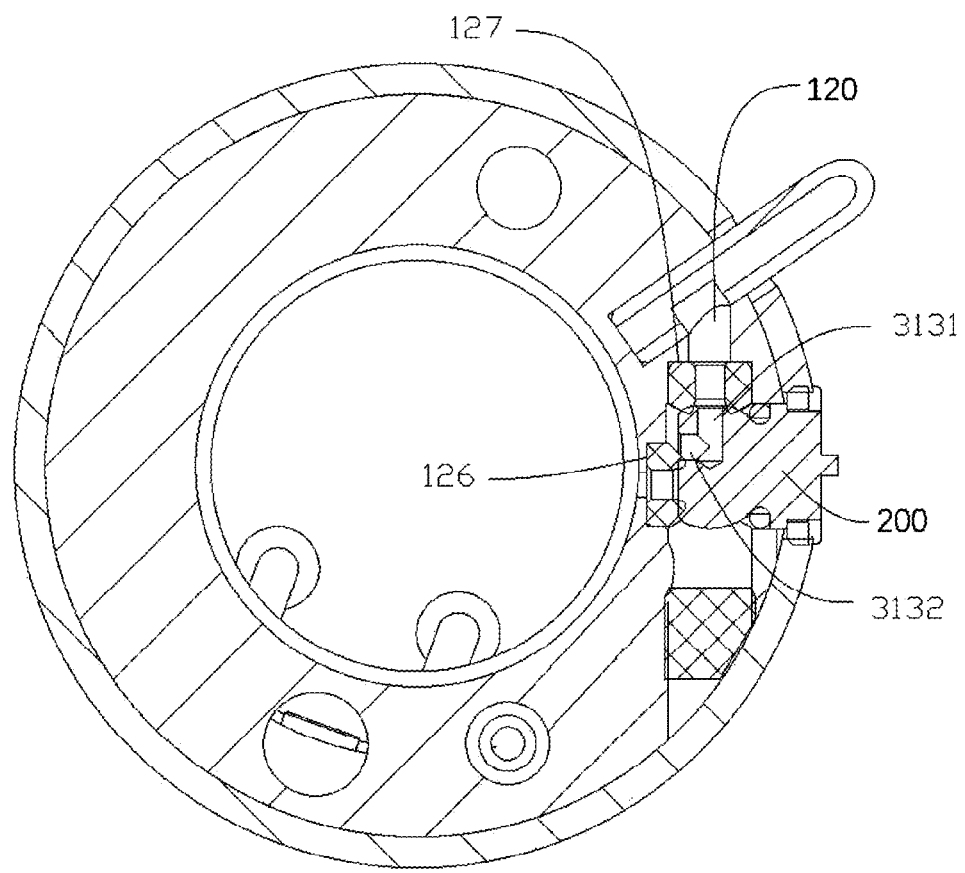
FIG. 15 is a structural schematic view of the head assembly when the reversing valve is located in a second operation position in an embodiment of the present disclosure.

Referring to FIG. 14 and FIG. 15, in the present embodiment, it may be noted that the reversing valve 200 has a first operation position and a second operation position which are switchable with each other when the reversing valve is rotated relative to the hand-piece main body 100. When the reversing valve 200 is located in the first operation position, the first flow channel 110, the second hole segment 3132, the first hole segment 3131, and the transfer cavity are in communication in sequence, an end of the second hole segment 3132 away from the first hole segment 3131 is located in a region surrounded by the second sealing ring 510, the second hole segment 3132 is in communication with the radial hole segment 1222 of the first flow channel 110 through the second sealing ring 510, and the outer circumferential surface 311 of the sealing body 310 blocks the second flow channel 120 through the third sealing ring 610. When the reversing valve 200 is located in the second operation position, the second flow channel 120, the first hole segment 3131, the second hole segment 3132, and the transfer cavity are in communication in sequence, an end of the first hole segment 3131 away from the second hole segment 3132 is located in a region surrounded by the third sealing ring 610, the first hole segment 3131 is in communication with the second flow channel 120 through the third sealing ring 610, and the inner end surface 312 of the sealing body 310 blocks the first flow channel 110 through the second sealing ring 510.

It should be understood that, when the reversing valve is located in the first operation position, the head assembly 0001 for a dental contra-angle hand-piece can perform the inner-water-channel water delivery; and when the reversing valve is located in the second operation position, the head assembly 0001 can perform the outer-water-channel water delivery.

Optionally, a torque transmission portion 321 is provided on an end surface of the force transmission body 320 away from the sealing body 310, and the torque transmission portion 321 is configured to be engaged with a force applying tool, so as to make the reversing valve 200 rotate relative to the hand-piece main body 100 under the driving of the force applying tool. The force applying tool may be a wrench, a screw driver, or the like. The torque transmission portion 321 may be a protrusion or a groove, and both the protrusion and the groove may be in a strip-shaped structure.

In other embodiments, optionally, at least one first limiting part may be provided on the shell 110, and at least one second limiting part 322 may be provided on the force transmission body 320. The first limiting part and the second limiting part 322 may both be protrusions. When the reversing valve 200 is rotated relative to the hand-piece main body 100, the first limiting part can abut against the second limiting part 322, thereby limiting a rotation angle of the reversing valve 200. Specifically, there are two first limiting parts, and one second limiting part 322. When the second limiting part 322 abuts against one of the first limiting parts, the reversing valve 200 is located in the first operation position, and when the second limiting part 322 abuts against the other one of the first limiting parts, the reversing valve 200 is located in the second operation position. Without doubt, in other embodiments, there may be one first limiting part and two second limiting parts 322.

Alternatively, in other embodiments, the first limiting part can be provided on the fixing seat 120. Alternatively, one of the first limiting part and the second limiting part 322 is a protrusion, and the other is a groove.

Referring to FIG. 14, in other embodiments, optionally, a locking ring 800 is mounted on the shell 1100 in a position corresponding to the second mounting hole 111, and the locking ring 800 may be detachably connected to the shell 1100 by a screw or a snap member. After the locking ring 800 is connected to the shell 1100, the locking ring 800 abuts against a side of the force transmission body 320 away from the shell 1100, so as to prevent the reversing valve 200 from disengaging from the hand-piece main body 100 via an orifice of the second mounting hole 111.

In other embodiments, optionally, two confluence channels 313 may be provided on the reversing valve 200, and when the reversing valve 200 is located in the first operation position, a channel A makes the first flow channel 110 be in communication with the inner water pipe 300, and the second flow channel 120 is discommunicated from the inner water pipe 300. When the reversing valve 200 is located in the second operation position, a channel B makes the second flow channel 120 be in communication with the inner water pipe 300, and the first flow channel 110 is discommunicated from the inner water pipe 300.

The head assembly 0001 for a dental contra-angle hand-piece provided in the present embodiment can be switched between the state of inner-water-channel delivery and the state of outer-water-channel delivery as required, is flexible and convenient to use, and has a wide application range, and a low cost.

Figure 16:
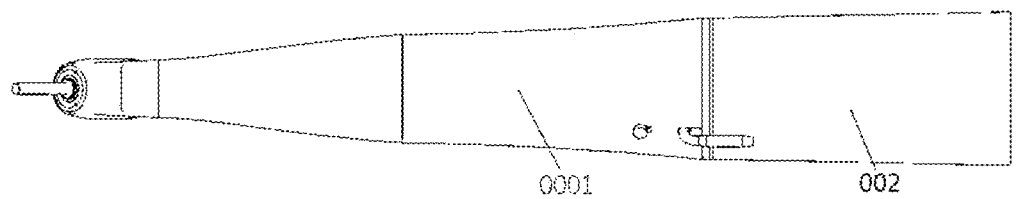
FIG. 16 is a structural schematic view of the dental contra-angle hand-piece in an embodiment of the present disclosure.

Referring to FIG. 9 and FIG. 16, the present embodiment further provides a dental contra-angle hand-piece, including a motor 002, an external pipeline 900, and the head assembly 0001 for a dental contra-angle hand-piece described in the above embodiments, wherein both the motor 002 and the external pipeline 900 are connected to the hand-piece main body 100; the reversing valve 200 of the head assembly 0001 is configured to make the liquid outlet of the motor 002 and the external pipeline 900 alternatively be in communication with the inner water pipe 300. When the dental contra-angle hand-piece is used, the state of the head assembly can be adjusted as required according to the field situation, so that it can be switched between two states of inner-water-channel water delivery and outer-water-channel water delivery, and is convenient and flexible to operate, and convenient to use.

The above-mentioned are merely for preferred embodiments of the present disclosure and not used to limit the present disclosure. For one skilled in the art, various modifications and changes may be made to the present disclosure. Any modifications, equivalent substitutions, improvements and so on, made within the spirit and principle of the present disclosure, should be covered within the scope of protection of the present disclosure.

INDUSTRIAL APPLICABILITY

The head assembly for a dental contra-angle hand-piece provided by the present disclosure includes a hand-piece main body, an inner water tube and a reversing valve, wherein the hand-piece main body is provided with a first flow channel and a second flow channel independent from each other, the first flow channel is configured to be in communication with a liquid outlet of a motor, and the second flow channel is configured to be in communication with an external pipeline; the inner water pipe is connected to the hand-piece main body; the reversing valve is provided with a confluence channel; the reversing valve is movably connected to the hand-piece main body, the reversing valve is configured to enable, when moving relative to the hand-piece main body, the first flow channel and the second flow channel to alternatively be in communication with the inner water pipe through the confluence channel. the dental contra-angle hand-piece provided by the present disclosure includes the head assembly mentioned above. The head assembly and the dental contra-angle hand-piece including the same can be switched between the state of inner-water-channel water delivery and the state of outer-water-channel water delivery, so as to satisfy the use requirements of different scenarios, has flexible and convenient use, and is safe and reliable; and the dental contra-angle hand-piece can perform the inner-water-channel water delivery or the outer-water-channel water delivery as needed, have diversified functions, flexible and reliable operation, and high safety.

What is claimed is:

1. A head assembly for a dental contra-angle hand-piece, comprising:
   a hand-piece main body, wherein the hand-piece main body is provided with a first flow channel and a second flow channel independent from each other, the first flow channel is configured to be in communication with a liquid outlet of a motor, and the second flow channel is configured to be in communication with an external pipeline;
   an inner water pipe, wherein the inner water pipe is connected to the hand-piece main body; and
   a reversing valve, wherein the reversing valve is provided with a confluence channel; the reversing valve is movably connected to the hand-piece main body, the reversing valve is configured to enable, when moving relative to the hand-piece main body, the first flow channel and the second flow channel to alternatively communicate with the inner water pipe through the confluence channel;
   wherein the reversing valve is further provided with a first port and a second port both in communication with the confluence channel; the reversing valve is configured to be switched between a first operation position and a second operation position, wherein when the reversing valve is located in the first operation position, the first port is in communication with the first flow channel and the second port is discommunicated from the second flow channel; and when the reversing valve is located in the second operation position, the first port is discommunicated from the first flow channel and the second port is in communication with the second flow channel; and the inner water pipe is in communication with the confluence channel, and is configured to deliver a fluid to a head portion of the hand-piece main body.

2. The head assembly according to claim 1, wherein the hand-piece main body is provided with a fitting hole, the first flow channel and the second flow channel are both in communication with the fitting hole, the reversing valve is provided in the fitting hole, and the reversing valve is configured to slidably cooperate with the hand-piece main body in an extending direction of the hand-piece main body, so as to enable the reversing valve to be switched between the first operation position and the second operation position.

3. The head assembly according to claim 2, wherein the dental contra-angle hand-piece further comprises a toggle member, the toggle member is connected to the reversing valve, the toggle member protrudes out from an outer circumferential wall of the hand-piece main body, and the toggle member is configured to slidably cooperate with the hand-piece main body in the extending direction of the hand-piece main body, so as to drive the reversing valve to be switched between the first operation position and the second operation position.

4. The head assembly according to claim 3, wherein the hand-piece main body is provided with a first limiting portion and a second limiting portion arranged at an interval in the extending direction of the hand-piece main body, the toggle member is located between the first limiting portion and the second limiting portion, and the first limiting portion and the second limiting portion are configured to alternatively abut against the toggle member, so as to limit a sliding range of the toggle member.

5. The head assembly according to claim 4, wherein when the reversing valve is switched between the first operation position and the second operation position, a flow rate is adjusted by adjusting an overlapped area of the first port and the first flow channel during communication between the first port and the first flow channel; and the flow rate is adjusted by adjusting an overlapped area of the second port and the second flow channel during communication between the second port and the second flow channel.

6. The head assembly according to claim 4, wherein the hand-piece main body is further provided with an operation hole in communication with the fitting hole, the operation hole is located on the outer circumferential wall of the hand-piece main body, the operation hole is a strip-shaped hole and extends along the extending direction of the hand-piece main body, the first limiting portion and the second limiting portion are provided on a hole wall of the operation hole, and the toggle member passes through the operation hole and protrudes out from the outer circumferential wall of the hand-piece main body.

7. The head assembly according to claim 2, wherein the hand-piece main body is provided with a pressure relief hole in communication with the fitting hole.

8. The head assembly according to claim 2, wherein the inner water pipe is inserted into the confluence channel, and the inner water pipe is configured to slidably cooperate with the reversing valve in the extending direction of the hand-piece main body.

9. The head assembly according to claim 1, wherein an inner circumferential wall of the hand-piece main body is further provided with an annular gas passage, and the annular gas passage is configured to be in communication with a gas outlet of the motor.

10. The head assembly according to claim 1, wherein the head assembly further comprises at least one sealing member, and the at least one sealing member is provided between the reversing valve and the hand-piece main body, and is configured to seal a gap between the hand-piece main body and the reversing valve.

11. The head assembly according to claim 10, wherein an outer circumferential wall of the reversing valve is provided with at least one annular positioning groove, and the at least one sealing member is provided in the at least one annular positioning groove.

12. A dental contra-angle hand-piece, comprising the head assembly according to claim 1.

* * * * *